(12) United States Patent
Arnault et al.

(10) Patent No.: US 11,680,634 B2
(45) Date of Patent: Jun. 20, 2023

(54) PULLEY DEVICE, IN PARTICULAR FOR TENSIONING IDLER OR RUNNER ROLLER

(71) Applicant: Aktiebolaget SKF, Gothenburg (SE)

(72) Inventors: Benoit Arnault, Saint-Cyr-sur-Loire (FR); Nicolas Tronquoy, Fondettes (FR); Philippe Walter, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 157 days.

(21) Appl. No.: 17/208,623

(22) Filed: Mar. 22, 2021

(65) Prior Publication Data

US 2021/0207699 A1 Jul. 8, 2021

Related U.S. Application Data

(62) Division of application No. 16/185,477, filed on Nov. 9, 2018, now Pat. No. 11,060,598.

(30) Foreign Application Priority Data

Dec. 20, 2017 (DE) .......................... 102017223317.6

(51) Int. Cl.
*F16H 55/44* (2006.01)
*F16H 7/12* (2006.01)
*F16H 7/08* (2006.01)

(52) U.S. Cl.
CPC .............. *F16H 55/44* (2013.01); *F16H 7/08* (2013.01); *F16H 7/12* (2013.01); *F16H 2007/0865* (2013.01)

(58) Field of Classification Search
CPC .... F16C 13/006; F16C 2361/63; F16C 19/06; F16C 35/067; F16H 55/36; F16H 2007/0865; F16H 7/20; F16H 55/44
(Continued)

(56) References Cited

U.S. PATENT DOCUMENTS 665,643 A * 1/1901 McCabe ............... F16C 13/006
384/547
1,482,579 A * 2/1924 Nice ....................... F16C 33/60
384/546
(Continued)

FOREIGN PATENT DOCUMENTS

DE 202005011230 U1 9/2005
DE 102005003844 A1 8/2006
(Continued)

*Primary Examiner* — Henry Y Liu
(74) *Attorney, Agent, or Firm* — Garcia-Zamor Intellectual Property Law, LLC; Ruy Garcia-Zamor

(57) ABSTRACT

A pulley device comprising a pulley and a bearing. The pulley has at least one "C-shaped" pulley part having an inner portion mounted on the bearing, an outer portion having an outer cylindrical surface dedicated to interact with a belt or a chain, and an intermediate portion extending substantially radially between axial ends of inner and outer portions on one axial side of pulley device. The outer cylindrical surface of outer ring is provided with at least one recess having in cross-section, a concave internal profile. The pulley part is provided with at least one protruding portion which inwardly extends beyond the inner cylindrical surface of inner portion. The protruding portion is received in a corresponding recess of outer ring so as to block the pulley part with respect to the outer ring in both axial directions.

6 Claims, 11 Drawing Sheets

(58) Field of Classification Search
USPC .................................................. 474/198, 199
See application file for complete search history.

(56) References Cited

U.S. PATENT DOCUMENTS

| | | | | | |
|---|---|---|---|---|---|
| 1,627,558 | A * | 5/1927 | Grunwald | ............. | F16C 13/006 29/524.1 |
| 1,845,631 | A * | 2/1932 | Seelbach | ................ | E05D 13/00 474/183 |
| 1,848,144 | A * | 3/1932 | Pribil | ..................... | B60L 5/06 474/199 |
| 1,903,776 | A * | 4/1933 | Clark | ................... | F16C 35/077 29/520 |
| 2,137,987 | A * | 11/1938 | Smith | ...................... | F16H 7/18 384/547 |
| 2,198,831 | A * | 4/1940 | Moyer | ................... | D06M 15/07 474/190 |
| 2,315,357 | A * | 3/1943 | Smith | ..................... | F16H 7/18 16/45 |
| 2,349,281 | A * | 5/1944 | Kendall | .................... | F16H 7/20 384/547 |
| 2,530,665 | A * | 11/1950 | Searles | ................ | F16C 13/006 29/898.07 |
| 2,655,813 | A * | 10/1953 | Howell | .................... | F16H 55/36 384/547 |
| 2,669,878 | A * | 2/1954 | Nelson | .................... | F16H 55/44 474/181 |
| 3,367,199 | A * | 2/1968 | Dankowski | ............. | F16H 55/42 474/182 |
| 3,490,285 | A * | 1/1970 | Donath | .................... | F16H 7/12 474/187 |
| 3,789,683 | A * | 2/1974 | Frost | ...................... | F16H 55/44 474/181 |
| 3,871,241 | A * | 3/1975 | Pestka | ................... | F16C 13/006 474/135 |
| 3,918,277 | A * | 11/1975 | Nakk | ...................... | F16C 19/54 68/140 |
| 3,990,136 | A * | 11/1976 | Hishida | ................. | F16C 35/067 264/273 |
| 4,033,196 | A * | 7/1977 | Maeda | ................... | F16H 7/1281 474/135 |
| 4,073,551 | A * | 2/1978 | Sutowski | ................ | F16C 19/18 384/510 |
| 4,402,678 | A * | 9/1983 | St. John | ................. | B23P 11/00 474/171 |
| 4,443,210 | A * | 4/1984 | Olschewski | ............ | F16H 55/44 474/902 |
| 4,457,740 | A * | 7/1984 | Olschewski | .......... | F16C 13/006 474/112 |
| 4,474,562 | A * | 10/1984 | Heurich | ................ | F16H 7/1281 29/520 |
| 4,504,252 | A * | 3/1985 | Honma | ................. | F16C 13/006 474/135 |
| 4,516,962 | A * | 5/1985 | Brandenstein | ........ | F16H 7/1281 474/112 |
| 4,518,372 | A * | 5/1985 | Dye | ...................... | F16C 13/006 474/94 |
| 4,557,708 | A * | 12/1985 | Brandenstein | ........ | F16H 7/1281 474/112 |
| 4,568,316 | A * | 2/1986 | Veikley | ............... | F16H 57/0463 474/199 |
| 4,571,227 | A * | 2/1986 | Colanzi | ................ | F16H 55/36 474/169 |
| 4,591,352 | A * | 5/1986 | Olschewski | .......... | F16H 7/1281 474/112 |
| 4,610,645 | A * | 9/1986 | Donn | ................... | F16H 7/1281 474/112 |
| 4,610,646 | A * | 9/1986 | Walter | ................... | F16H 7/20 474/197 |
| 4,668,209 | A * | 5/1987 | Kyoosei | ............... | F16H 55/48 264/328.8 |
| 4,831,705 | A * | 5/1989 | Kanemitsu | ........... | B21D 53/261 72/82 |
| 4,917,655 | A * | 4/1990 | Martin | ................... | F16H 7/1281 474/135 |
| 5,630,769 | A * | 5/1997 | Schmidt | ................ | F16C 13/006 474/902 |
| 5,725,448 | A * | 3/1998 | Kato | ...................... | F16C 13/006 384/510 |
| 5,728,020 | A * | 3/1998 | Muranaka | ............ | C10M 107/02 384/462 |
| 5,913,743 | A * | 6/1999 | Ohta | ...................... | F16H 7/1218 474/135 |
| 6,001,037 | A * | 12/1999 | Rocca | ................... | F16H 7/1281 474/135 |
| 6,010,420 | A * | 1/2000 | Niki | ...................... | F16C 19/166 474/199 |
| 6,102,822 | A * | 8/2000 | Nakazeki | ............. | F16C 33/416 384/523 |
| 6,196,720 | B1 * | 3/2001 | Nozaki | ................. | C10M 169/02 384/13 |
| 6,220,982 | B1 * | 4/2001 | Kawashima | ............ | F16H 55/44 384/536 |
| 6,241,257 | B1 * | 6/2001 | Hauck | ................... | F16C 13/006 384/489 |
| 6,270,001 | B1 * | 8/2001 | Tadic | .................... | B23P 15/003 228/256 |
| 6,293,885 | B1 * | 9/2001 | Serkh | ................... | F16H 55/44 474/133 |
| 6,450,689 | B1 * | 9/2002 | Takatsu | ............... | B29C 45/14311 384/543 |
| 6,572,270 | B2 * | 6/2003 | Takemura | ............... | F16H 55/36 474/170 |
| 6,605,574 | B2 * | 8/2003 | Asao | ..................... | F16C 13/006 508/552 |
| 6,659,649 | B2 * | 12/2003 | Ishiguro | ............... | F04D 13/021 384/543 |
| 6,692,393 | B2 * | 2/2004 | Fukuwaka | .......... | F16C 33/7853 474/135 |
| 6,860,639 | B2 * | 3/2005 | Tabuchi | ................ | F16C 35/067 384/537 |
| 7,011,593 | B2 * | 3/2006 | Schenk | ...................... | F16H 7/20 384/477 |
| 7,041,019 | B2 * | 5/2006 | Matsubara | ............ | F04B 27/0895 474/70 |
| 7,108,623 | B2 * | 9/2006 | Cadarette | ................ | F16H 55/36 474/166 |
| 7,325,974 | B2 * | 2/2008 | Tanabe | ................ | F16C 33/7853 384/543 |
| 7,364,522 | B2 * | 4/2008 | Miyata | .................... | F16H 55/36 474/151 |
| 7,448,806 | B2 * | 11/2008 | Ishiguro | ............... | F04B 27/1063 384/417 |
| 7,695,385 | B2 * | 4/2010 | Barraud | .................. | F16C 41/04 474/199 |
| 7,909,701 | B2 * | 3/2011 | Ishikawa | .................... | F16D 9/08 192/56.5 |
| 7,993,228 | B2 * | 8/2011 | Nosaka | ................ | F16H 55/36 474/170 |
| 8,012,053 | B2 * | 9/2011 | Filip | ........................ | F16H 7/20 474/49 |
| 8,167,750 | B2 * | 5/2012 | Hamada | ................ | F16H 55/48 474/195 |
| 8,172,056 | B2 * | 5/2012 | Barraud | ................ | F16D 41/069 192/113.32 |
| 8,235,851 | B2 * | 8/2012 | Eidloth | ............... | F16C 33/7859 474/199 |
| 8,506,434 | B2 * | 8/2013 | Harvey | ..................... | F16D 3/72 464/57 |
| 8,512,185 | B2 * | 8/2013 | Baer | ...................... | F16H 55/36 474/199 |
| 8,617,016 | B2 * | 12/2013 | Dutil | ................... | F16H 55/40 474/166 |
| 8,790,018 | B2 * | 7/2014 | Leuver | ................... | B65G 39/09 384/546 |
| 9,028,352 | B2 * | 5/2015 | Wilson | ................. | F16C 35/073 384/537 |
| 9,206,838 | B2 * | 12/2015 | Mola | .................. | F16C 13/006 |
| 9,273,772 | B2 * | 3/2016 | Ichikawa | ............... | F16H 55/48 |

(56) References Cited

U.S. PATENT DOCUMENTS

| | | | |
|---|---|---|---|
| 9,416,863 B2* | 8/2016 | Schaefer | F16H 55/48 |
| 9,453,571 B2* | 9/2016 | Qin | F16H 55/44 |
| 9,682,621 B2* | 6/2017 | Dell | F16D 3/12 |
| 9,709,154 B2* | 7/2017 | Albrecht | F16B 41/002 |
| 9,834,083 B2* | 12/2017 | Blessing | B60K 6/42 |
| 9,841,096 B2* | 12/2017 | Bell | F16H 55/48 |
| 9,927,017 B2* | 3/2018 | van den Heuvel | F16H 55/50 |
| 10,030,758 B2* | 7/2018 | Basile | F16H 55/36 |
| 10,082,200 B2* | 9/2018 | Lescorail | F16H 55/36 |
| 10,088,031 B2* | 10/2018 | Koda | F16H 55/44 |
| 10,132,399 B2* | 11/2018 | Chollet | F16C 13/006 |
| 10,220,432 B2* | 3/2019 | Pan | B21D 22/14 |
| 10,228,051 B2* | 3/2019 | Basile | F16H 55/566 |
| 10,274,013 B2* | 4/2019 | Pallini | F16C 13/006 |
| 10,393,252 B2* | 8/2019 | Liege | F16H 7/08 |
| 10,520,029 B2* | 12/2019 | Iino | F16C 19/527 |
| 10,539,185 B2* | 1/2020 | Kunishima | F16C 35/077 |
| 10,634,189 B2* | 4/2020 | Kunishima | F16C 33/586 |
| 10,662,997 B2* | 5/2020 | Park | F16C 35/063 |
| 2004/0178398 A1* | 9/2004 | Miller | F16H 55/44 474/166 |
| 2008/0300077 A1* | 12/2008 | Kapfer | F16C 13/006 474/133 |
| 2009/0191999 A1* | 7/2009 | Joseph | F16H 55/36 384/485 |
| 2011/0009220 A1* | 1/2011 | Arnault | F16C 35/073 474/166 |
| 2011/0039648 A1* | 2/2011 | Lannutti | F16C 33/7896 474/166 |
| 2011/0111900 A1* | 5/2011 | Wilson | F16C 13/006 474/166 |
| 2016/0356375 A1* | 12/2016 | Chollet | F16C 13/006 |
| 2017/0037953 A1* | 2/2017 | Liege | F16H 55/36 |

FOREIGN PATENT DOCUMENTS

| | | |
|---|---|---|
| DE | 102006002966 A1 | 7/2007 |
| DE | 202007010473 U1 | 9/2007 |
| EP | 1967766 A2 | 9/2008 |
| GB | 190509598 A | 5/1906 |
| GB | 141829 A | 4/1920 |
| WO | 2010/006857 A1 | 1/2010 |

* cited by examiner

PULLEY DEVICE, IN PARTICULAR FOR TENSIONING IDLER OR RUNNER ROLLER

CROSS-REFERENCE TO PRIORITY APPLICATION

This divisional application claims priority to U.S. patent application Ser. No. 16/185,477 filed on Nov. 9, 2018, which claims the benefit of German patent application number 102017223317.6, filed on Dec. 12, 2020, the contents of which are all fully incorporated herein by reference.

TECHNICAL FIELD OF THE PRESENT INVENTION

The present invention relates to the field of pulley devices for tensioning idlers or runner rollers designed to interact with a chain or a belt, for example a distribution belt of an internal combustion engine of a vehicle.

BACKGROUND

Such rollers are usually used to keep a constant tension on the belt or chain in a determined range or to locally modify the path taken by the chain or belt. These are called respectively tensioning idlers or runner rollers. In runner rollers, the pulley is mounted so as to rotate on a screw or a spindle by means of a rolling bearing, the roller then being attached directly or indirectly to the engine block or to an element of a tensioning idler device, for example an articulated arm or an eccentric.

Document GB 190509598 discloses a pulley comprising male and female overlapping parts which are interlocking relation and form a cylindrical outer portion intended to be in contact with a belt.

A major disadvantage of this pulley is that an annular recess is formed on the outer portion adapted to support the belt when the male and female parts are fastened together. There is therefore a risk of an early wear of the belt.

It is also known by document GB 141 829 a pulley comprising a peripheral part intended to be in contact with a belt, an inner part and a intermediate part between the inner and outer parts. The pulley is tightened to the outer ring of bearing, but the pulley can slightly axially move during the service use of pulley device. Moreover, with a pulley such as disclosed, the outer part may be deformed radially inwards by bending under the action of the belt.

It has been proposed in document DE 202005011230 U1 to house a damping ring within a C-shaped pulley, the damping element being dedicated to damp vibrations from the belt and being suitable to limit radial inward deformation of outer portion of the pulley. However, the pulley can still be deformed under heavy loads.

BRIEF SUMMARY OF THE PRESENT INVENTION

The aim of the invention is to overcome these drawbacks by proposing a pulley which is easy to install onto a bearing, of good rigidity, adapted to avoid an early wear of the belt, and permitting an efficient support of the belt.

To this end, the invention relates to a pulley device suitable for a belt of chain tensioning idler or runner roller, comprising a bearing and a pulley. The bearing comprises a rotatable outer ring and a fixed inner ring, the rings being coaxial. The pulley comprises at least one pulley part having in cross section an overall shape of a C, and having an inner cylindrical portion with an inner cylindrical surface mounted on an outer cylindrical surface of outer ring of bearing, an outer cylindrical portion having an outer cylindrical surface intended to be in contact with the belt or the chain, and a radial intermediate portion extending substantially radially between axial ends of inner and outer cylindrical portions on one axial side of pulley device, the pulley part being formed integral and defining an open end on one axial side.

According to the invention, the outer cylindrical surface of outer ring of bearing is provided with at least one recess having in cross section a concave internal profile. Furthermore, the pulley part is provided with at least one protruding portion which inwardly extends beyond the inner cylindrical surface of inner portion, the protruding portion being received in a corresponding recess of outer ring so as to block pulley part with respect to the outer ring in both axial directions.

According to further aspects of the invention which are advantageous but not compulsory, such a pulley device may incorporate one or several of the following features:
- The bearing is a rolling bearing, at least one row of rolling elements being radially interposed between the inner ring and the outer ring.
- The rolling elements are balls.
- The rolling elements are equally circumferentially spaced and maintained by an annular cage.
- The pulley is formed by only one pulley part.
- The axial length of the inner portion of pulley part is at least equal to 90% of the axial length of the outer cylindrical surface of the outer ring of bearing.
- The pulley devices comprises a pulley having two C-shaped pulley parts mounted onto the outer cylindrical surface of outer ring of bearing, open ends of the pulley parts axially facing each other, each of the pulley parts being provided with a spacer.
- The two pulley parts are symmetrical with respect to a transverse radial plane passing through the center of the bearing.
- The total length of the inner portions of the two C-shaped pulleys mounted onto the outer ring is at least equal to 90% of the axial length of the outer cylindrical surface of the outer ring.
- The outer portion of pulley part is of greater axial length than that of the inner portion, the outer portion protruding axially on at least one axial side of the inner portion.
- The pulley part is made from a stamped metal sheet or blank.
- The recess provided to the outer cylindrical surface of outer ring of bearing is an annular groove.
- The recess is centered on a transverse radial plane passing through the center of the bearing.
- The recess is situated on outer cylindrical surface of outer ring, in close vicinity of a radial lateral surface of the outer ring.
- The protruding portion is annular, and the recess is an annular groove.
- The pulley part comprises a plurality of circumferentially spaced protruding portions, each being received by a corresponding recess of outer ring.
- The protruding portion provided to the pulley part consists in a bent edge of free end of inner cylindrical portion of pulley part, the bent edge being received by recess of outer ring.
- The pulley part comprises a plurality of bent lugs, each being received by a corresponding recess of outer ring.

The bent lugs radially inwardly extend from inner portion of pulley part.

The bent lugs radially inwardly extend from outer portion of pulley part, the bent lugs passing through the open end of pulley part, the bent lugs radially extending along inner portion edge and up to outer ring corresponding recess.

The pulley part comprises a plurality of protruding material deformations formed by crimping of the inner portion of pulley part, the protruding material deformations being each received in a corresponding recess of outer ring.

The pulley part comprises a plurality of bent lugs radially outwardly extending from the inner annular portion, free end of the lugs coming in contact with an inner surface or bore of outer annular portion, the lugs being provided with a cut inner portion forming a lug in the same radial direction and radially inwardly extending in a corresponding recess of outer ring of bearing.

BRIEF DESCRIPTION OF THE DRAWINGS

The invention will now be explained in correspondence with the annexed figures, as illustrative examples, without restricting the object of the invention. In the annexed figures.

DETAILED DESCRIPTION OF THE PRESENT INVENTION

Figure 1:
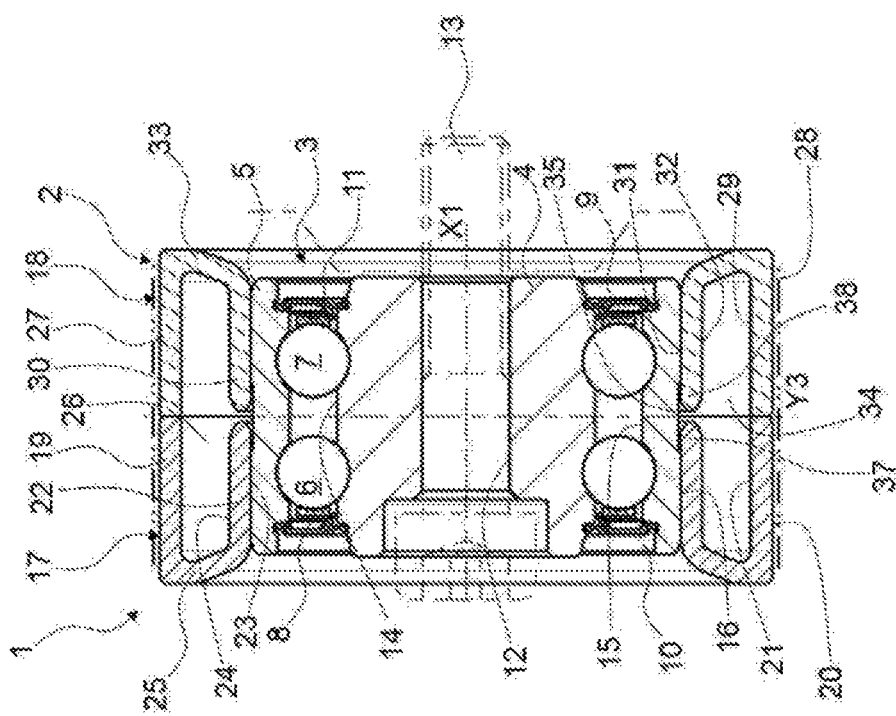
FIG. 1 presents an axial section of a pulley device according to a first embodiment of the invention.
Figure 2:
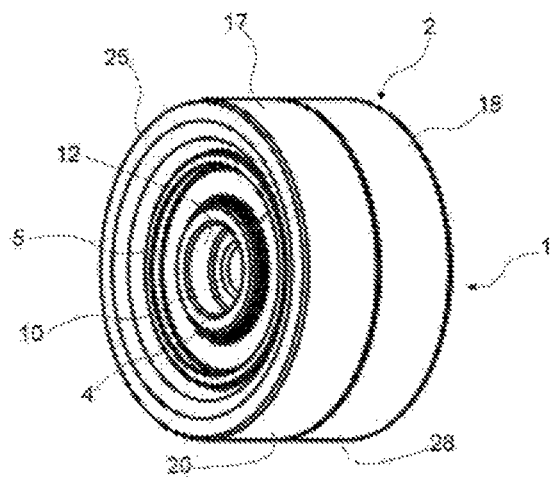
FIG. 2 presents a perspective view of the pulley device originally introduced in FIG. 1.
Figure 3:
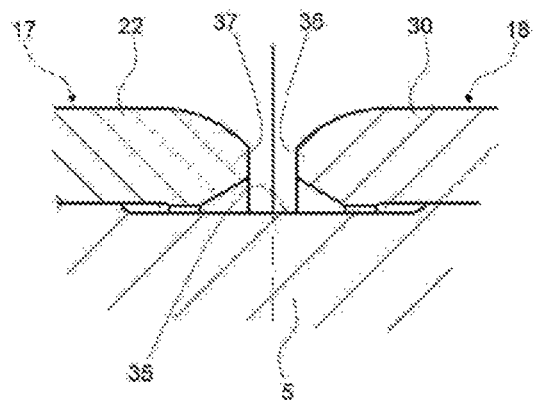
FIG. 3 presents a detailed view of the pulley device originally introduced in FIG. 1.

The pulley device 1 as illustrated in FIGS. 1 to 3 is suitable for a belt or chain tensioning idler or runner roller, and comprises a pulley 2 adapted to interact with a belt or chain (not shown) and a rolling bearing 3 with a geometric axis X1.

The rolling bearing comprises a fixed inner ring 4 and a rotatable outer ring 5 between which are housed two rows of rolling elements 6 and 7, which in this case are balls, two annular cages 8, 9 respectively maintaining the circumferential spacing of the rolling elements 6, 7, and two annular seals 10, 11.

The inner ring 4 and the outer ring 5 are concentric and symmetric with respect to a transverse radial plane Y3 passing through the center of the rolling bearing 3. The rings 4, 5 are advantageously of solid type. A solid type is to be understood as a ring obtained by machining with removal of material, by machining, grinding, from a metal tube stock, bar stock, rough forgings and/or rolled blanks.

The inner ring 4 comprises a bore 12 dedicated to receive a fastening screw 13 (in dotted line) to fasten the device 1 on an external support. The inner ring further comprises an outer cylindrical surface 14 onto which toroidal circular raceways are formed, the raceways having in cross section a concave internal profile adapted to the rolling elements 6, 7.

The outer ring 5 comprises a cylindrical bore 15 onto which toroidal circular raceways are formed, the raceways having in cross section a concave internal profile adapted to receive the rolling elements 6, 7. The outer ring 5 further comprises an outer cylindrical surface 16.

The pulley 2 has two pulley parts 17, 18, both having in cross section an overall shape of a C.

The first pulley part 17 comprises an axial annular outer portion 19 providing a cylindrical outer surface 20 designed to interact with a portion of the belt of the chain, and a cylindrical inner surface or bore 21.

The first pulley part 17 also comprises an axial annular inner portion 22 providing a cylindrical inner surface or bore 23 into which the outer cylindrical surface 16 of outer ring 5 of bearing 3 is mounted, and a cylindrical outer surface 24.

The outer portion 19 is of larger diameter than that of the inner portion 22, the outer portion 19 radially surrounding the inner portion 22. Advantageously, the outer portion 19 is of greater axial length than that of the inner portion 22, the outer portion 19 protruding axially on at least one axial side of the inner portion 22.

The first pulley part 17 further comprises an annular radial intermediate portion 25 extending substantially radially between axial ends of inner and outer cylindrical portions 22, 19 on a first axial side of pulley device 1.

The first pulley part 17 then has in cross section an overall shape of a C, defining an open end 26 on one axial side of the pulley device 1. The first pulley part 17 is formed integral.

The second pulley part 18 comprises an axial annular outer portion 27 providing a cylindrical outer surface 28 designed to interact with a portion the belt of the chain, and a cylindrical inner surface or bore 29.

The second pulley part 18 also comprises an axial annular inner portion 30 providing a cylindrical inner surface or bore 31 into which the outer cylindrical surface 16 of outer ring 5 of bearing 3 is mounted, and a cylindrical outer surface 32.

The outer portion 27 is of larger diameter than that of the inner portion 30, the outer portion 27 radially surrounding the inner portion 30. Advantageously, the outer portion 27 is of greater axial length than that of the inner portion 30, the outer portion 27 protruding axially on at least one axial side of the inner portion 30.

The second pulley part 18 further comprises an annular radial intermediate portion 33 extending substantially radially between axial ends of inner and outer cylindrical portions 30, 27 on a second axial side of pulley device 1, the second axial side being axially opposite to the first axial side.

The second pulley part 18 then has in cross section an overall shape of a C, defining an open end 34 on one axial side of the pulley device 1. The second pulley part 18 is formed integral.

Advantageously, the pulley parts 17, 18 are both made of thin metal sheet or blank by folding, cutting and stamping.

Advantageously, the two C-shaped pulley parts 17, 18 are symmetrical with each other with respect to the radial plane Y3. The free ends of outer portions 19, 27 of first and second pulley parts 17, 18 respectively come into contact in an axial direction, the open ends 26, 34 respectively being axially open to each other. The two outer cylindrical surfaces 20, 28 form a surface dedicated to interact with the belt or the chain. The pulley 2 formed by the two pulley parts 17, 18 arranged in axial contact with each other is suitable for guiding, supporting the belt of the chain with an efficient manner.

According to the invention, the outer cylindrical surface 20 of outer ring 5 of bearing 3 is provided with an annular groove 35. The groove 35 is centered on the transverse radial plane Y3 passing through the center of the bearing 3.

Each of the pulley parts 17, 18 of pulley 2 further comprises a protruding portion 37, 38, respectively. More precisely:

The inner annular portion 22 of first pulley part 17 comprises a free edge 37 which is radially inwardly bent towards the outer ring 5 of bearing 3. The bent edge 37 is received by the annular groove 35 of the outer ring 5.

Similarly and symmetrically, the inner annular portion 30 of second pulley part 18 comprises a free edge 38 which is radially inwardly bent towards the outer ring 5 of bearing 3. The the bent edge 38 is also received by the annular groove 35 of the outer ring 5.

The two bent edges 37, 38 are axially facing each other with respect to the central radial plane Y3, and are both received in the same groove 35 of outer ring 5.

The two parts 17, 18 of pulley 2 are then axially blocked in both axial direction with respect to the outer ring 5 of bearing 3. Even in case of heavy vibrations or shocks, the pulley 2 is prevented for axial movement and is suitable to efficiently support the belt of the chain for an increased and efficient service life.

Figure 4:
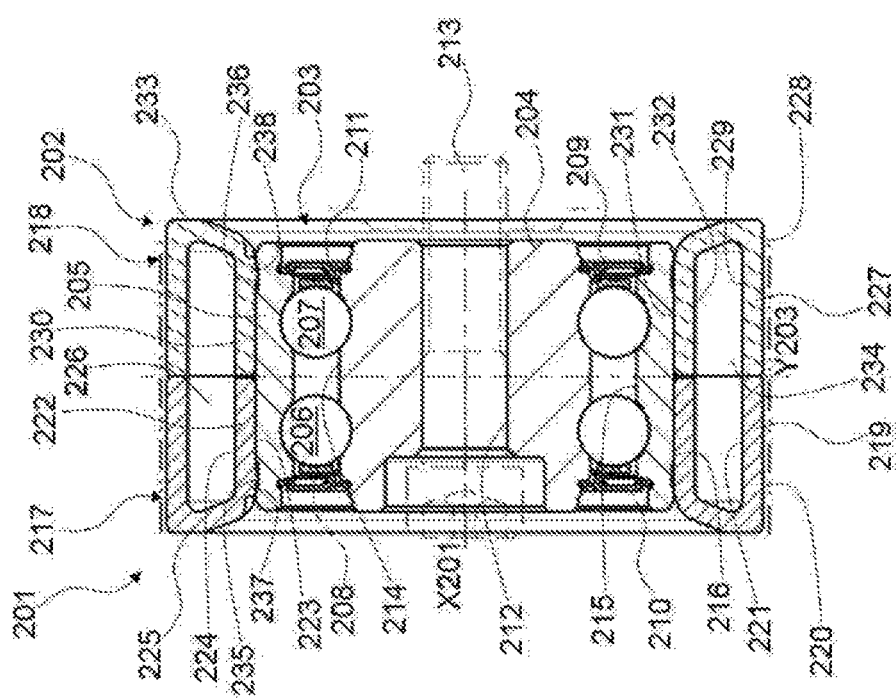
FIG. 4 presents an axial section of a pulley device according to a second embodiment of the invention.
Figure 5:
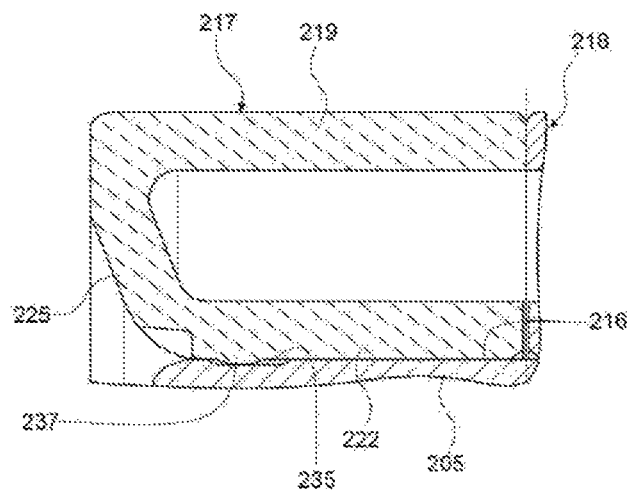
FIG. 5 presents a detailed view of the pulley device originally introduced in FIG. 4.

In a second embodiment of the invention shown in FIGS. 4 and 5, the pulley device 201 with a geometric axis X201 comprises a pulley 202 having two C-shaped pulley parts 217, 218 mounted onto a rolling bearing 203 having two annular grooves 235, 236 which interact with corresponding protruding portions 237, 238 respectively of the first and second pulley parts 217, 218.

The rolling bearing 203 is essentially of similar construction as the rolling bearing 3 of FIGS. 1 to 3. Rolling bearing 203 comprises a fixed inner ring 204 and a rotatable outer ring 205 between which are housed two rows of rolling elements 206 and 207, which in this case are balls, two annular cages 208, 209 respectively maintaining the circumferential spacing of the rolling elements 206, 207, and two annular seals 210, 211. The inner ring 204 and the outer ring 205 are concentric and symmetric with respect to a transverse radial plane Y203 passing through the center of the rolling bearing 203.

The inner ring 204 comprises a bore 212 dedicated to receive a fastening screw 213 (in dotted line) to fasten the device 201 on an external support. The inner ring further comprises an outer cylindrical surface 214 onto which toroidal circular raceways are formed, the raceways having in cross section a concave internal profile adapted to the rolling elements 206, 207.

The outer ring 205 comprises a cylindrical bore 215 onto which toroidal circular raceways are formed, the raceways having in cross section a concave internal profile adapted to receive the rolling elements 206, 207. The outer ring 205 further comprises an outer cylindrical surface 216.

The pulley 202 has two pulley parts 217, 218, both having in cross section an overall shape of a C. The pulley 202 with pulley parts 217, 218 is of essential similar construction as the pulley 2 with pulley parts 17, 18, respectively, of FIGS. 1 to 3.

The first pulley part 217 comprises an axial annular outer portion 219 providing a cylindrical outer surface 220 designed to interact with a portion of the belt of the chain, and a cylindrical inner surface or bore 221.

The first pulley part 217 also comprises an axial annular inner portion 222 providing a cylindrical inner surface or bore 223 into which the outer cylindrical surface 216 of outer ring 205 of bearing 203 is mounted, and a cylindrical outer surface 224.

The outer portion 219 is of larger diameter than that of the inner portion 222, the outer portion 219 radially surrounding the inner portion 222. Advantageously, the outer portion 219 is of greater axial length than that of the inner portion 222, the outer portion 219 protruding axially on at least one axial side of the inner portion 222.

The first pulley part 217 further comprises an annular radial intermediate portion 225 extending substantially radially between axial ends of inner and outer cylindrical portions 222, 219 on a first axial side of pulley device 201.

The first pulley part 217 then has in cross section an overall shape of a C, defining an open end 226 on one axial side of the pulley device 201. The first pulley part 217 is formed integral.

The second pulley part 218 comprises an axial annular outer portion 227 providing a cylindrical outer surface 228 designed to interact with a portion the belt of the chain, and a cylindrical inner surface or bore 229.

The second pulley part 218 also comprises an axial annular inner portion 230 providing a cylindrical inner surface or bore 231 into which the outer cylindrical surface 216 of outer ring 205 of bearing 203 is mounted, and a cylindrical outer surface 232.

The outer portion 227 is of larger diameter than that of the inner portion 230, the outer portion 227 radially surrounding the inner portion 230. Advantageously, the outer portion 227 is of greater axial length than that of the inner portion 230, the outer portion 227 protruding axially on at least one axial side of the inner portion 230.

The second pulley part 218 further comprises an annular radial intermediate portion 233 extending substantially radially between axial ends of inner and outer cylindrical portions 230, 227 on a second axial side of pulley device 201, the second axial side being axially opposite to the first axial side.

The second pulley part 218 then has in cross section an overall shape of a C, defining an open end 234 on one axial side of the pulley device 201. The second pulley part 218 is formed integral.

Advantageously, the two C-shaped pulley parts 217, 218 are symmetrical with each other with respect to the radial plane Y203.

According to this second embodiment of the invention, the outer cylindrical surface 216 of outer ring 205 of bearing 203 comprises two annular grooves 235, 236. The grooves 235, 236 are situated in close vicinity of opposite radial lateral surfaces of the outer ring 205. The annular grooves 235, 236 are symmetric with respect to the central radial plane Y203. The annular groove 235 is provided above the inner annular portion 222 of first pulley part 217, the annular groove 235 being situated in close vicinity of a first lateral surface of outer ring 5 on a first axial side. The annular groove 236 is provided above the inner annular portion 230 of second pulley part 218, the annular groove 36 being situated in close vicinity of a second lateral surface of outer ring 205 on a second axial side which is axially opposite to the first axial side.

Each of the pulley parts 217, 218 of pulley 202 further comprises a protruding portion 237, 238, respectively. More precisely:

The inner annular portion 222 of first pulley part 217 comprises a plurality of material deformations 237 which are radially inwardly protruding towards the outer ring 205 of bearing 203. The protruding portions 237 are formed by axial crimping of the the inner portion 222 towards the opposite axial side. The protruding portions 237 are situated in close vicinity of the radial intermediate portion 225 of the first pulley part 217, on the first axial side of device 201. The protruding portions 237 are circumferentially spaced around the inner portion 222 of first pulley part 217. The protruding portions 237 are each received by the annular groove 235 of the outer ring 205.

Similarly and symmetrically, the inner annular portion 230 of second pulley part 218 comprises a plurality of material deformations 238 which are radially inwardly protruding towards the outer ring 205 of bearing 203. The protruding portions 238 are formed by axial crimping of the the inner portion 230 towards the opposite axial portion. The protruding portions 238 are situated in close vicinity of the radial intermediate portion 233 of the second pulley part 218, on the first axial side of device 201. The protruding portions 238 are circumferentially spaced around the inner portion 230 of second pulley part 218. The protruding portions 238 are each received by the annular groove 235 of the outer ring 205.

In the illustrated embodiments, the protruding portions 237, 238 are formed on the same radial planes. Alternatively, the protruding portions may be formed on different radial planes.

Figure 6:
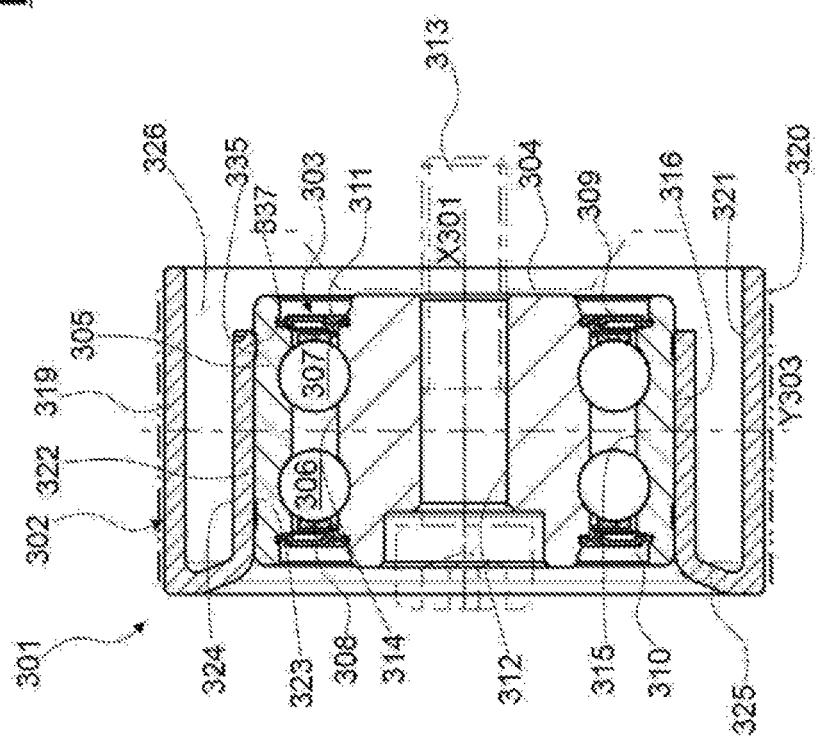
FIG. 6 presents an axial section of a pulley device according to a third embodiment of the invention.
Figure 7:
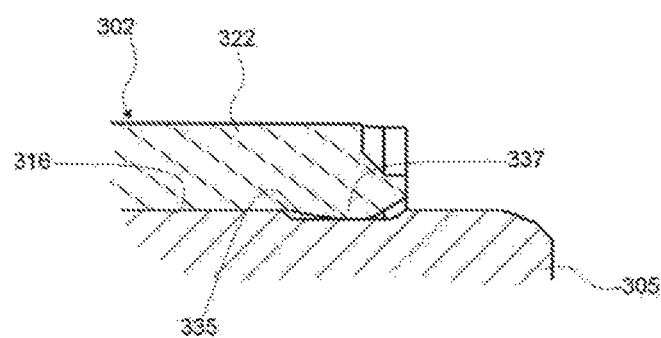
FIG. 7 presents a detailed view of the pulley device originally introduced in FIG. 6.

In a third embodiment of the invention shown in FIGS. 6 and 7, the pulley device 301 with a geometric axis X301 comprises a pulley 302 having only one part mounted onto a rolling bearing 303 having one annular groove 335 which interacts with a corresponding protruding portion 337 of the and pulley 302.

The rolling bearing 303 is essentially of similar construction as the rolling bearings 3 and 203 of FIGS. 1 to 5. Rolling bearing 303 comprises a fixed inner ring 304 and a rotatable outer ring 305 between which are housed two rows of rolling elements 306 and 307, which in this case are balls, two annular cages 308, 309 respectively maintaining the circumferential spacing of the rolling elements 306, 307, and two annular seals 310, 311. The inner ring 304 and the outer ring 305 are concentric and symmetric with respect to a transverse radial plane Y303 passing through the center of the rolling bearing 303.

The inner ring 304 comprises a bore 312 dedicated to receive a fastening screw 313 (in dotted line) to fasten the device 301 on an external support. The inner ring further comprises an outer cylindrical surface 314 onto which toroidal circular raceways are formed, the raceways having in cross section a concave internal profile adapted to the rolling elements 306, 307.

The outer ring 305 comprises a cylindrical bore 315 onto which toroidal circular raceways are formed, the raceways having in cross section a concave internal profile adapted to receive the rolling elements 306, 307. The outer ring 305 further comprises an outer cylindrical surface 316.

The pulley 302 has only one part having in cross section an overall shape of a C. The pulley 302 comprises an axial annular outer portion 319 providing a cylindrical outer surface 320 designed to interact with a portion of the belt of the chain, and a cylindrical inner surface or bore 321.

The pulley 302 also comprises an axial annular inner portion 322 providing a cylindrical inner surface or bore 323 into which the outer cylindrical surface 316 of outer ring 305 of bearing 303 is mounted, and a cylindrical outer surface 324.

The outer portion 319 is of larger diameter than that of the inner portion 322, the outer portion 319 radially surrounding the inner portion 322. Advantageously, the outer portion 319 is of greater axial length than that of the inner portion 322, the outer portion 319 protruding axially on at least one axial side of the inner portion 322.

Advantageously, the axial length of the inner portion 322 of pulley 302 is at least equal to 90% of the axial length of the outer cylindrical surface 316 of the outer ring 305 of bearing 303.

The pulley 302 further comprises an annular radial intermediate portion 325 extending substantially radially between axial ends of inner and outer cylindrical portions 322, 319 on a first axial side of pulley device 301.

The pulley 302 then has in cross section an overall shape of a C, defining an open end 326 on one axial side of the pulley device 301. The pulley 302 is formed integral.

According to the invention, the outer cylindrical surface 316 of outer ring 305 of bearing 303 comprises one annular groove 335. The groove 335 is situated in close vicinity of a radial lateral surfaces of the outer ring 305 which is axially opposite to the radial intermediate portion 325 of pulley 302.

The inner annular portion 322 of pulley 302 comprises a plurality of material deformations 337 which are radially inwardly protruding towards the outer ring 305 of bearing 303. The protruding portions 337 are formed by axial crimping of the the inner portion 322 towards the opposite axial side. The protruding portions 337 are situated on the opposite axial side of the radial intermediate portion 325 of the first pulley part 317. The protruding portions 337 are circumferentially spaced around the inner portion 322 of first pulley part 317. The protruding portions 337 are each received by the annular groove 335 of the outer ring 305.

As an alternate not shown, the groove on outer ring may be provided on the axial side of the radial intermediate portion of pulley, the protrusions being provided on the inner surface of inner portion on this side, the protrusions being received in the groove.

Figure 8:
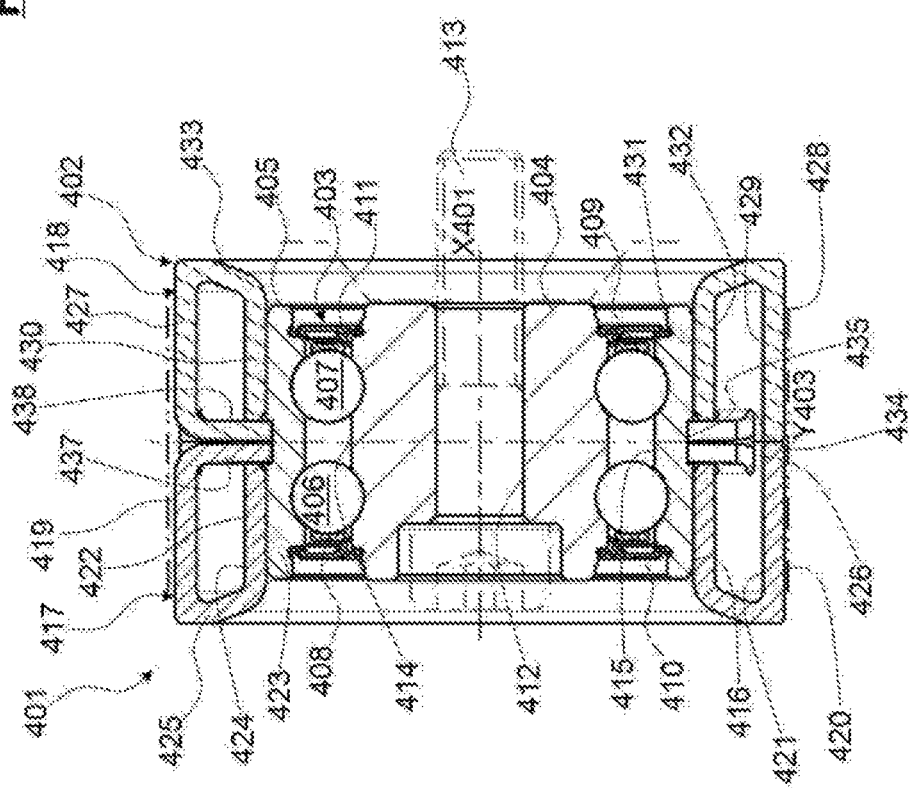
FIG. 8 presents an axial section of a pulley device according to a fourth embodiment of the invention.
Figure 9:
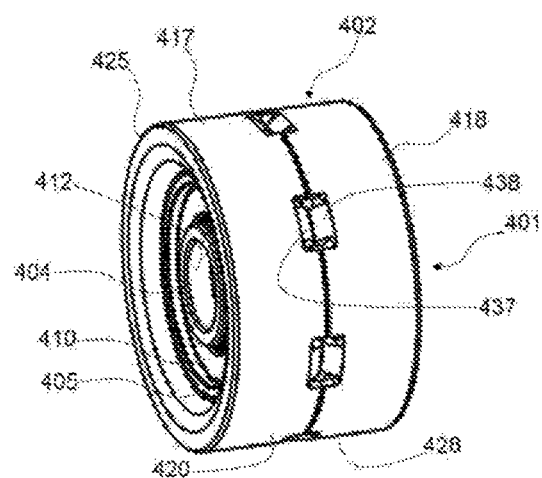
FIG. 9 presents a perspective view of the pulley device originally introduced in FIG. 8.
Figure 10:
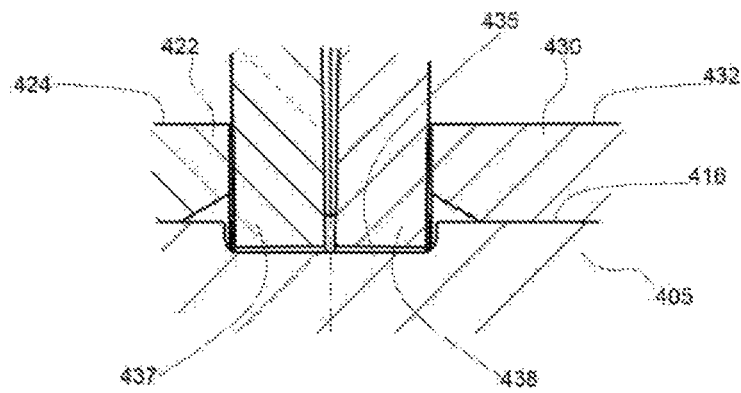
FIG. 10 presents a detailed view of the pulley device originally introduced in FIG. 8.
Figure 11:
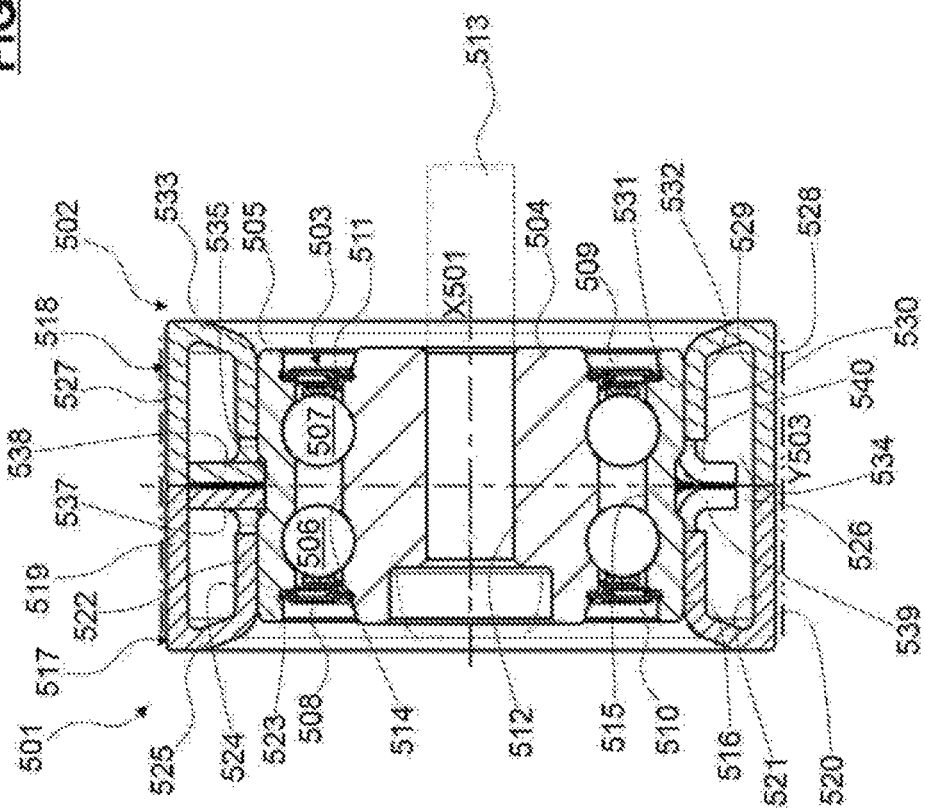
FIG. 11 presents an axial section of a pulley device according to a fifth embodiment of the invention.
Figure 12:
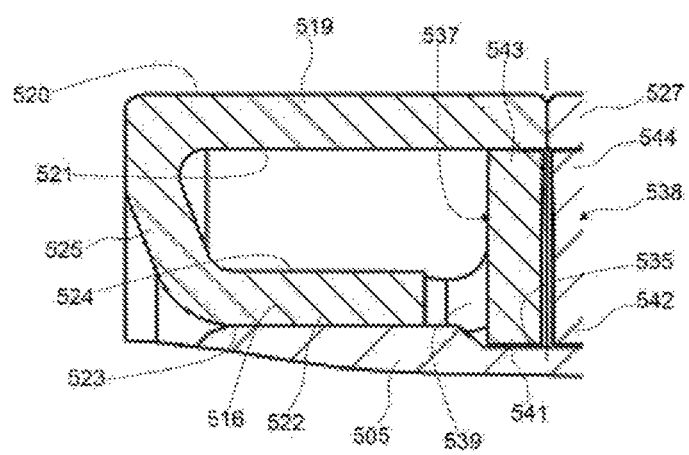
FIG. 12 presents a detailed view of the pulley device originally introduced in FIG. 11.
Figure 13:
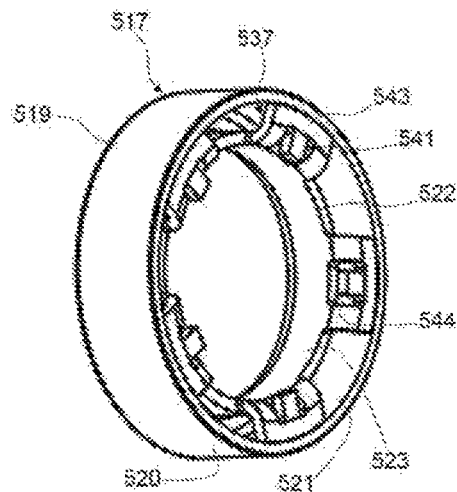
FIG. 13 presents a perspective view of a pulley provided to the pulley device originally introduced in FIG. 11.
Figure 14:
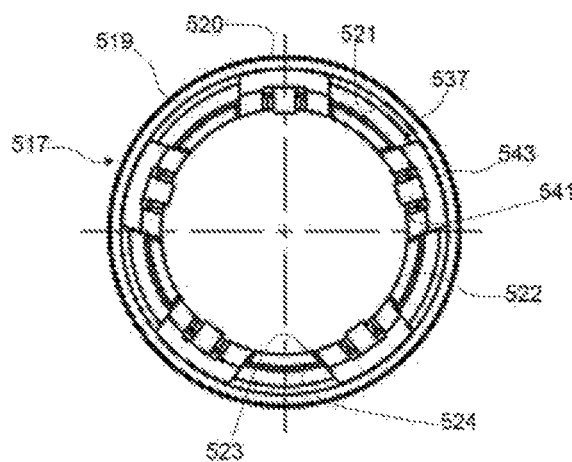
FIG. 14 presents a bottom view of the pulley originally presented in FIG. 13.

In a fourth embodiment of the invention shown in FIGS. 8 to 10, the pulley device 401 comprises a pulley 402 having two C-shaped pulley parts 417, 418 mounted onto a bearing 403 having one central annular groove 435 which interact with corresponding bent lugs 437, 438 respectively, which inwardly radially extend from outer portions 419, 427 respectively, of the first and second pulley parts 417, 418.

The rolling bearing 403 is essentially of similar construction as the rolling bearings 3, 203 and 303 of FIGS. 1 to 7. Rolling bearing 403 comprises a fixed inner ring 404 and a rotatable outer ring 405 between which are housed two rows of rolling elements 406 and 407, which in this case are balls, two annular cages 408, 409 respectively maintaining the circumferential spacing of the rolling elements 406, 407, and two annular seals 410, 411. The inner ring 404 and the outer ring 405 are concentric and symmetric with respect to a transverse radial plane Y403 passing through the center of the rolling bearing 403.

The inner ring 404 comprises a bore 412 dedicated to receive a fastening screw 413 (in dotted line) to fasten the device 401 on an external support. The inner ring further comprises an outer cylindrical surface 414 onto which toroidal circular raceways are formed, the raceways having in cross section a concave internal profile adapted to the rolling elements 406, 407.

The outer ring 405 comprises a cylindrical bore 415 onto which toroidal circular raceways are formed, the raceways having in cross section a concave internal profile adapted to receive the rolling elements 406, 407. The outer ring 405 further comprises an outer cylindrical surface 416.

The pulley 402 has two pulley parts 417, 418, both having in cross section an overall shape of a C. The pulley 402 with pulley parts 417, 418 is of essential similar construction as the pulley 2 with pulley parts 17, 18, respectively, of FIGS. 1 to 3.

The first pulley part 417 comprises an axial annular outer portion 419 providing a cylindrical outer surface 420 designed to interact with a portion of the belt of the chain, and a cylindrical inner surface or bore 421.

The first pulley part 417 also comprises an axial annular inner portion 422 providing a cylindrical inner surface or bore 423 into which the outer cylindrical surface 416 of outer ring 405 of bearing 403 is mounted, and a cylindrical outer surface 424.

The outer portion 419 is of larger diameter than that of the inner portion 422, the outer portion 419 radially surrounding the inner portion 422. The outer portion 419 is of greater axial length than that of the inner portion 422, the outer portion 419 protruding axially on the axial side of radial plane Y403.

The first pulley part 417 further comprises an annular radial intermediate portion 425 extending substantially radially between axial ends of inner and outer cylindrical portions 422, 419 on a first axial side of pulley device 401.

The first pulley part 417 then has in cross section an overall shape of a C, defining an open end 426 on one axial side of the pulley device 401. The first pulley part 417 is formed integral.

The second pulley part 418 comprises an axial annular outer portion 427 providing a cylindrical outer surface 428 designed to interact with a portion the belt of the chain, and a cylindrical inner surface or bore 429.

The second pulley part 418 also comprises an axial annular inner portion 430 providing a cylindrical inner surface or bore 431 into which the outer cylindrical surface 416 of outer ring 405 of bearing 403 is mounted, and a cylindrical outer surface 432.

The outer portion 427 is of larger diameter than that of the inner portion 430, the outer portion 427 radially surrounding the inner portion 430. Advantageously, the outer portion 427 is of greater axial length than that of the inner portion 430, the outer portion 427 protruding axially on the axial side of radial plane Y403.

The second pulley part 418 further comprises an annular radial intermediate portion 433 extending substantially radially between axial ends of inner and outer cylindrical portions 430, 427 on a second axial side of pulley device 401, the second axial side being axially opposite to the first axial side.

The second pulley part 418 then has in cross section an overall shape of a C, defining an open end 434 on one axial side of the pulley device 401. The second pulley part 418 is formed integral.

Advantageously, the two C-shaped pulley parts 417, 418 are symmetrical with each other with respect to the radial plane Y403.

According to this fourth embodiment of the invention, the outer cylindrical surface 416 of outer ring 405 of bearing 403 comprises one annular groove 435. The groove 435 is centered on the transverse radial plane Y403 passing through the center of the bearing 403.

The first pulley part 417 comprises a plurality of bent lugs 437 which are radially inwardly extending from the outer portion 419 towards the outer ring 405. The lugs 437 form each a radial protruding portion that extends through the open end 426 of the pulley part, in close vicinity of the central radial plane Y403. Free ends of the lugs 437 are each received within the annular groove 435 of outer ring 405.

Similarly and symmetrically with respect to the central radial plane Y403, the second pulley part 418 comprises a plurality of bent lugs 438 which are radially inwardly extending from the outer portion 427 towards the outer ring 405. The lugs 438 form each a radial protruding portion that extends through the open end 434 of the pulley part, in close vicinity of the central radial plane Y403. Free ends of the lugs 438 are each received within the annular groove 435 of outer ring 405.

The lugs 437, 438 are axially adjacent by pairs. Tow lugs 437, 438 of a pair are axially blocked between walls defined by the annular groove 435. The two parts 417, 418 of pulley 402 are then axially blocked in both axial direction with respect to the outer ring 405 of bearing 403. Even in case of heavy vibrations or shocks, the pulley 402 is prevented for axial movement and is suitable to efficiently support the belt of the chain for an increased and efficient service life.

Thanks to this embodiment of the invention, when the belt or the chain exerts an inwards radial load on the outer portions 419, 427 of pulley 402, the inner free edges of bent lugs 437, 438 are pressed in radial direction against of the bottom surface of annular groove 435 provided to the outer ring 405 of bearing 403. The outer axial portions 419, 427 are stiffened by the radial bent lugs 437, 438 respectively which are supported in radial direction by outer ring 405. The lugs 437, 438 permits to maintain in operating mode the radial position of the chain or the belt in contact with the outer surfaces 420, 428 of the outer portions 419, 427 respectively.

As an alternate not shown, the pulley may comprise only one pulley part, and the outer cylindrical surface of outer ring may comprise only one annular groove which receives a plurality of bent lugs extending from the outer portion of the pulley. Advantageously, the annular groove and the bent lugs are situated on the axial side of the open end of the C-shaped pulley.

In a fifth embodiment of the invention shown in FIGS. 11 to 14, the pulley device 501 comprises a pulley 502 having two C-shaped pulley parts 517, 518 mounted onto a bearing 503 having one central annular groove 535 which interact with corresponding bent lugs 537, 538 respectively, which inwardly radially extend from inner portions 522, 530 respectively, of the first and second pulley parts 517, 518.

The rolling bearing 503 is essentially of similar construction as the rolling bearings 3, 203, 303 and 403 of FIGS. 1 to 10. Rolling bearing 503 comprises a fixed inner ring 504 and a rotatable outer ring 505 between which are housed two rows of rolling elements 506 and 507, which in this case are balls, two annular cages 508, 509 respectively maintaining the circumferential spacing of the rolling elements 506, 507, and two annular seals 510, 511. The inner ring 504 and the outer ring 505 are concentric and symmetric with respect to a transverse radial plane Y503 passing through the center of the rolling bearing 503.

The inner ring 504 comprises a bore 512 dedicated to receive a fastening screw 513 (in dotted line) to fasten the device 501 on an external support. The inner ring further comprises an outer cylindrical surface 514 onto which toroidal circular raceways are formed, the raceways having in cross section a concave internal profile adapted to the rolling elements 506, 507.

The outer ring 505 comprises a cylindrical bore 515 onto which toroidal circular raceways are formed, the raceways having in cross section a concave internal profile adapted to receive the rolling elements 506, 507. The outer ring 405 further comprises an outer cylindrical surface 516.

The pulley 502 has two pulley parts 517, 518, both having in cross section an overall shape of a C. The pulley 502 with pulley parts 517, 518 is of essential similar construction as the pulley 2 with pulley parts 17, 18, respectively, of FIGS. 1 to 3.

The first pulley part 517 comprises an axial annular outer portion 519 providing a cylindrical outer surface 520 designed to interact with a portion of the belt of the chain, and a cylindrical inner surface or bore 521.

The first pulley part 517 also comprises an axial annular inner portion 522 providing a cylindrical inner surface or bore 523 into which the outer cylindrical surface 516 of outer ring 505 of bearing 503 is mounted, and a cylindrical outer surface 524.

The outer portion 519 is of larger diameter than that of the inner portion 522, the outer portion 519 radially surrounding the inner portion 522. The outer portion 519 is of greater axial length than that of the inner portion 522, the outer portion 519 protruding axially on the axial side of radial plane Y503.

The first pulley part 517 further comprises an annular radial intermediate portion 525 extending substantially radially between axial ends of inner and outer cylindrical portions 522, 519 on a first axial side of pulley device 501.

The first pulley part 517 then has in cross section an overall shape of a C, defining an open end 526 on one axial side of the pulley device 501. The first pulley part 517 is formed integral.

The second pulley part 518 comprises an axial annular outer portion 527 providing a cylindrical outer surface 528 designed to interact with a portion the belt of the chain, and a cylindrical inner surface or bore 529.

The second pulley part 518 also comprises an axial annular inner portion 530 providing a cylindrical inner surface or bore 531 into which the outer cylindrical surface 516 of outer ring 405 of bearing 503 is mounted, and a cylindrical outer surface 532.

The outer portion 527 is of larger diameter than that of the inner portion 530, the outer portion 527 radially surrounding the inner portion 530. Advantageously, the outer portion 527 is of greater axial length than that of the inner portion 530, the outer portion 527 protruding axially on the axial side of radial plane Y503.

The second pulley part 518 further comprises an annular radial intermediate portion 533 extending substantially radially between axial ends of inner and outer cylindrical portions 530, 527 on a second axial side of pulley device 501, the second axial side being axially opposite to the first axial side.

The second pulley part 518 then has in cross section an overall shape of a C, defining an open end 534 on one axial side of the pulley device 501. The second pulley part 518 is formed integral.

Advantageously, the two C-shaped pulley parts 517, 518 are symmetrical with each other with respect to the radial plane Y503.

According to this fifth embodiment of the invention, the outer cylindrical surface 516 of outer ring 505 of bearing 503 comprises one annular groove 535. The groove 535 is centered on the transverse radial plane Y503 passing through the center of the bearing 503.

The first pulley part 517 comprises a plurality of bent lugs 537 which are radially outwardly extending from the inner portion 522 towards the outer portion 519. The lugs 537 form each a radial protruding portion that extends through the open end 526 of the pulley part, in close vicinity of the central radial plane Y503. The lugs 537 comprise each an upper free end 543 which comes in contact in radial direction against the inner surface or bore 521 of outer portion 519. Furthermore, a cut 539 is provided to each of the lugs so as to define a lower free end 541. The lower free ends 541 of lugs 537 come in contact in radial direction against the bottom surface of annular groove 535 of outer ring 505. The lugs 437 have the shape of a radial portion extending each between an upper end 543 and a lower end 541, the lugs 537 being radially blocked between outer portion 519 of first pulley part 517 and groove 535 of outer ring 505.

Similarly and symmetrically, the second pulley part 518 comprises a plurality of bent lugs 538 which are radially outwardly extending from the inner portion 530 towards the outer portion 527. The lugs 538 form each a radial protruding portion that extends through the open end 534 of the pulley part, in close vicinity of the central radial plane Y503. The lugs 538 comprise each an upper free end 544 which comes in contact in radial direction against the inner surface or bore 529 of outer portion 527. Furthermore, a cut 540 is provided to each of the lugs so as to define a lower free end 542. The lower free ends 542 of lugs 538 come in contact in radial direction against the bottom surface of annular groove 535 of outer ring 505. The lugs 438 have the shape of a radial portion extending each between an upper end 544 and a lower end 542, the lugs 538 being radially blocked between outer portion 527 of second pulley part 518 and groove 535 of outer ring 505.

The lugs 537, 538 are axially adjacent by pairs. Lower free edges 541, 542 of lugs 537, 538 of a pair are axially blocked between walls defined by the annular groove 535. The two parts 517, 518 of pulley 502 are then axially blocked in both axial direction with respect to the outer ring 505 of bearing 503. Even in case of heavy vibrations or shocks, the pulley 502 is prevented for axial movement and is suitable to efficiently support the belt of the chain for an increased and efficient service life.

Thanks to this embodiment of the invention, when the belt or the chain exerts an inwards radial load on the outer portions 519, 527 of pulley 402, the inner cylindrical surfaces 521, 529 of the outer portions 519, 5127 respectively, are pressed in radial direction against the upper free edges 543, 544 of lugs 537, 538 respectively. Loads are transmitted through the radial portions of lugs 537, 538 to lower free edges 541, 542 of the lugs. Lower free edges 541, 542 are then pressed in radial direction against the bottom surface of groove 535 of outer ring 505. The outer axial portions 519, 527 are stiffened by the radial bent lugs 537, 538 respectively which are supported in radial direction by outer ring 505. The lugs 537, 538 permits to maintain in operating mode the radial position of the chain or the belt in contact with the outer surfaces 520, 528 of the outer portions 519, 527 respectively.

As an alternate not shown, the pulley may comprise only one pulley part, and the outer cylindrical surface of outer ring may comprise only one annular groove which receives a plurality of bent lugs extending from the lower portion of the pulley. Advantageously, the annular groove and the bent lugs are situated on the axial side of the open end of the C-shaped pulley.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pulley device.

Moreover, various features of the above-described representative examples, as well as the various independent and dependant claims below, may be combined in ways that are not specifically and explicitly enumerated in order to provide additional useful embodiments of the present teachings.

What is claimed is:

1. A pulley device suitable for a belt of one of chain tensioning idler or runner roller, comprising:
    a bearing comprising a rotatable outer ring and a fixed inner ring, the rings being coaxial, and
    a pulley comprising:
        a first pulley part having, when viewed in cross section, an overall shape of a "C", the first pulley part comprising:
            a first inner cylindrical portion with a first inner cylindrical surface mounted on an outer cylindrical surface of outer ring of bearing,
            a first outer cylindrical portion having a first outer cylindrical surface intended to be in contact with the belt or the chain, and
            a first radial intermediate portion extending substantially radially between axial ends of the first inner cylindrical portion and the first outer cylindrical portion on an axial side of the pulley device, and
        a second pulley part that, when viewed in cross-section, is symmetric with the first pulley part across a transverse radial plane extending through a geometric center of the pulley device, the second pulley part comprising:
            a second inner cylindrical portion with a second inner cylindrical surface mounted on the outer cylindrical surface of outer ring of bearing,
            a second outer cylindrical portion having a second outer cylindrical surface intended to be in contact with the belt or the chain, and
            a second radial intermediate portion extending substantially radially between axial ends of the second inner cylindrical portion and the second outer cylindrical portion on an opposite axial side of the pulley device,
    wherein the outer cylindrical surface of outer ring is provided with at least one recess having in cross section a concave internal profile, and
    wherein the first pulley part is provided with a first protruding portion which inwardly extends beyond the first inner cylindrical surface of the first inner cylindrical portion, the first protruding portion being received in a first corresponding recess of the outer ring so as to block the first pulley part with respect to the outer ring in both axial directions.

2. The pulley device according to claim 1, wherein the first corresponding recess is situated on outer cylindrical surface of outer ring, in close vicinity of a radial lateral surface of the outer ring.

3. The pulley device according to claim 1, wherein the first corresponding recess provided to the outer cylindrical surface of the outer ring is an annular groove.

4. The pulley device according to claim 1, wherein the second pulley part comprises a second protruding portion which inwardly extends beyond the second inner cylindrical surface of the second inner cylindrical portion, the second protruding portion being received by a second corresponding recess of the outer ring.

5. The pulley device according to claim 4, wherein the first and second protruding portions are material deformations formed by crimping the first and second inner cylindrical portions of the first and second pulley parts, respectively.

6. The pulley device according to claim 1, wherein the first pulley part and the second pulley part are made from one of a stamped metal sheet or a blank.

\* \* \* \* \*